Figure 1:
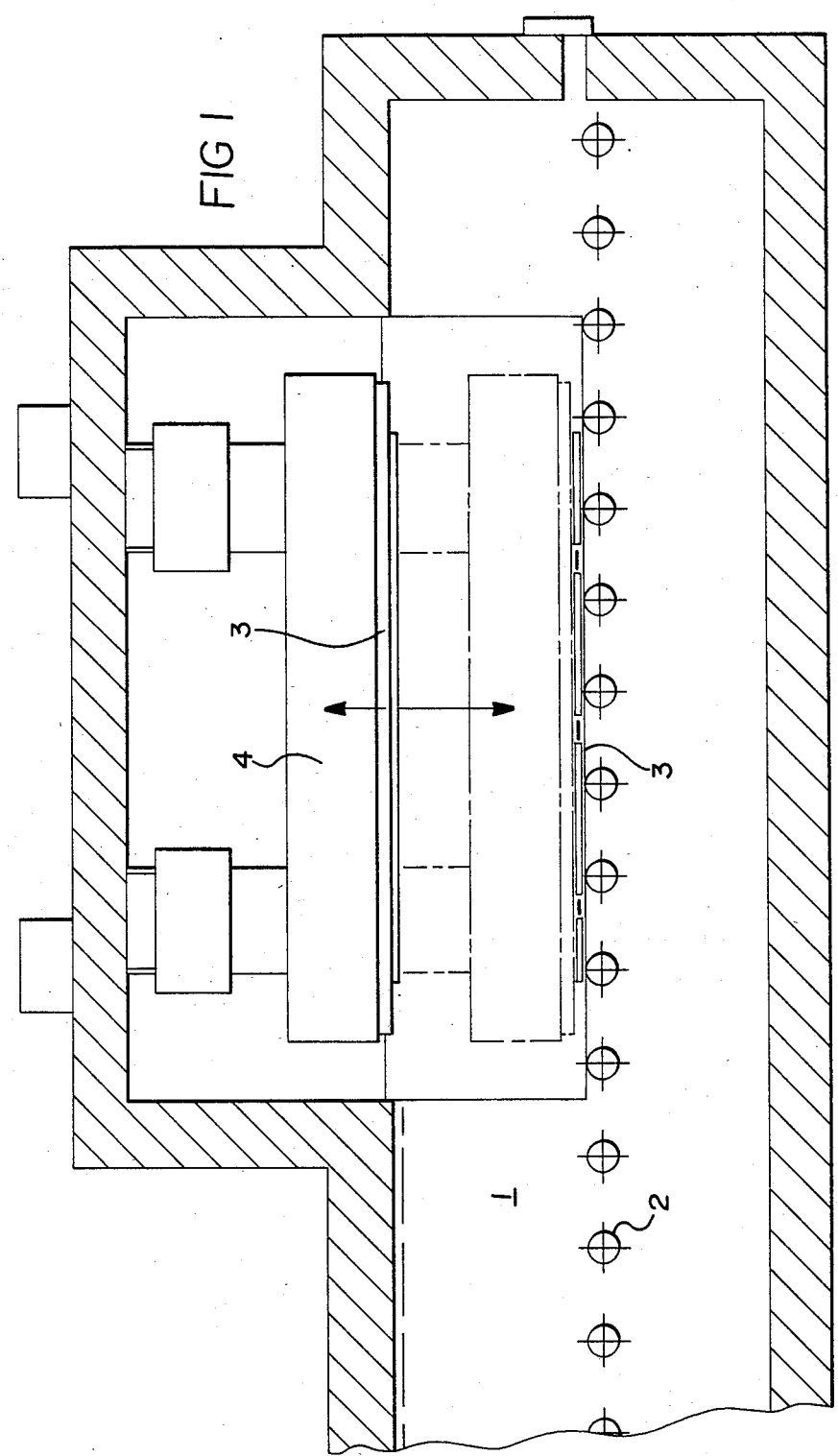

United States Patent [19]

Strauss

[11] Patent Number: 4,604,124
[45] Date of Patent: Aug. 5, 1986

[54] APPARATUS FOR MANUFACTURING OF TEMPERED, BENT GLASS SHEETS

[75] Inventor: Gottfried Strauss, Heiligenhaus, Fed. Rep. of Germany

[73] Assignee: Glasstemp of Toledo, Inc., Perrysburg, Ohio

[21] Appl. No.: 705,915

[22] Filed: Feb. 26, 1985

[30] Foreign Application Priority Data

Feb. 28, 1984 [DE] Fed. Rep. of Germany ....... 3407173

[51] Int. Cl.⁴ ........................................... C03B 23/03
[52] U.S. Cl. ...................................... 65/273; 65/104; 65/287
[58] Field of Search .......................... 65/104, 273, 287

[56] References Cited

U.S. PATENT DOCUMENTS

| 2,235,969 | 3/1941 | White | 65/273 X |
| 4,204,854 | 5/1980 | McMaster et al. | 65/104 X |
| 4,277,276 | 7/1981 | Kellar et al. | 65/104 X |
| 4,526,605 | 7/1985 | Frank et al. | 65/104 X |

Primary Examiner—Arthur Kellogg
Attorney, Agent, or Firm—Brooks & Kushman

[57] ABSTRACT

The apparatus for manufacturing of tempered, bent glass sheets comprises bending means (5) receiving the heated glass sheet in a horizontal position, said bending means (5) including a bending die (8) which, as well as the base supporting the glass sheet, is provided with coolant connections (13).

5 Claims, 5 Drawing Figures

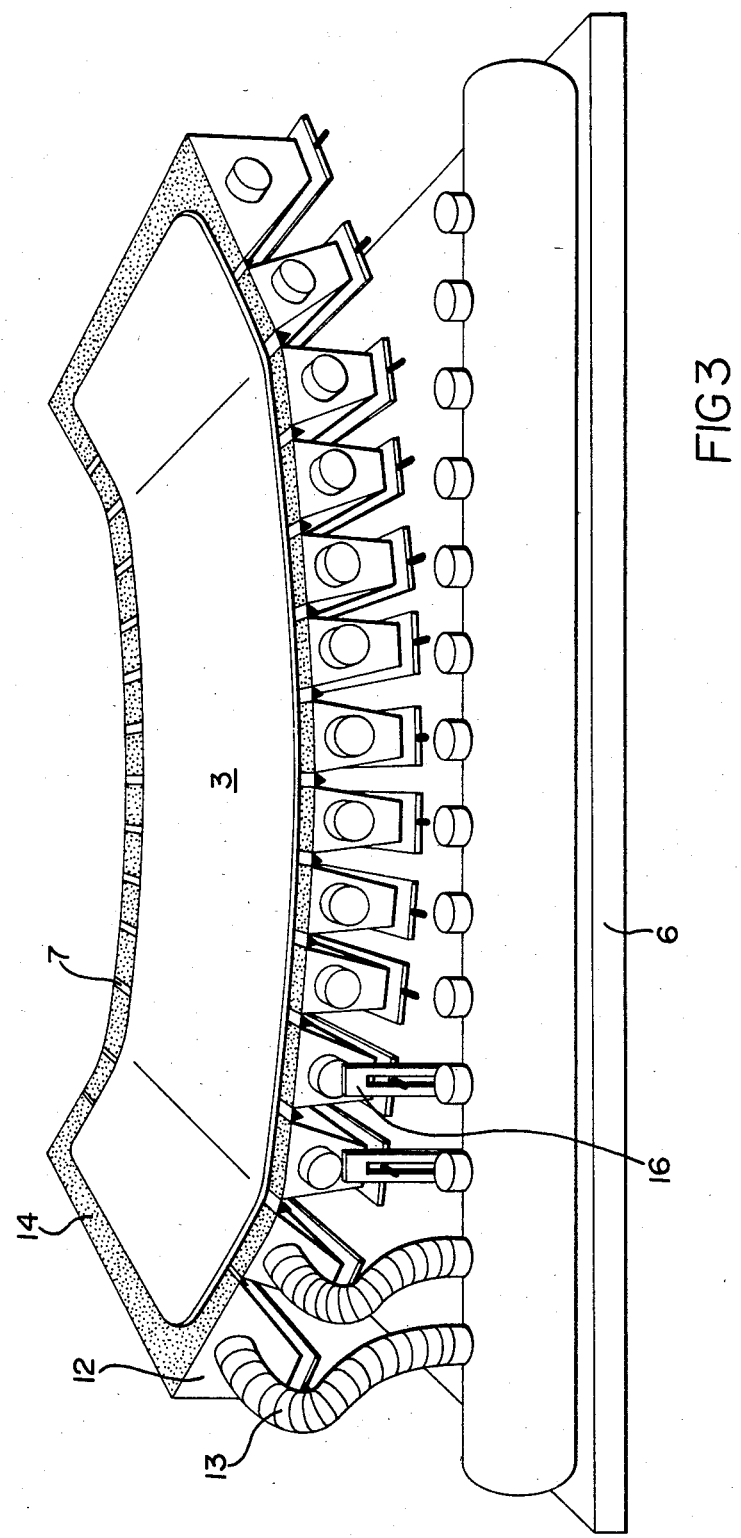

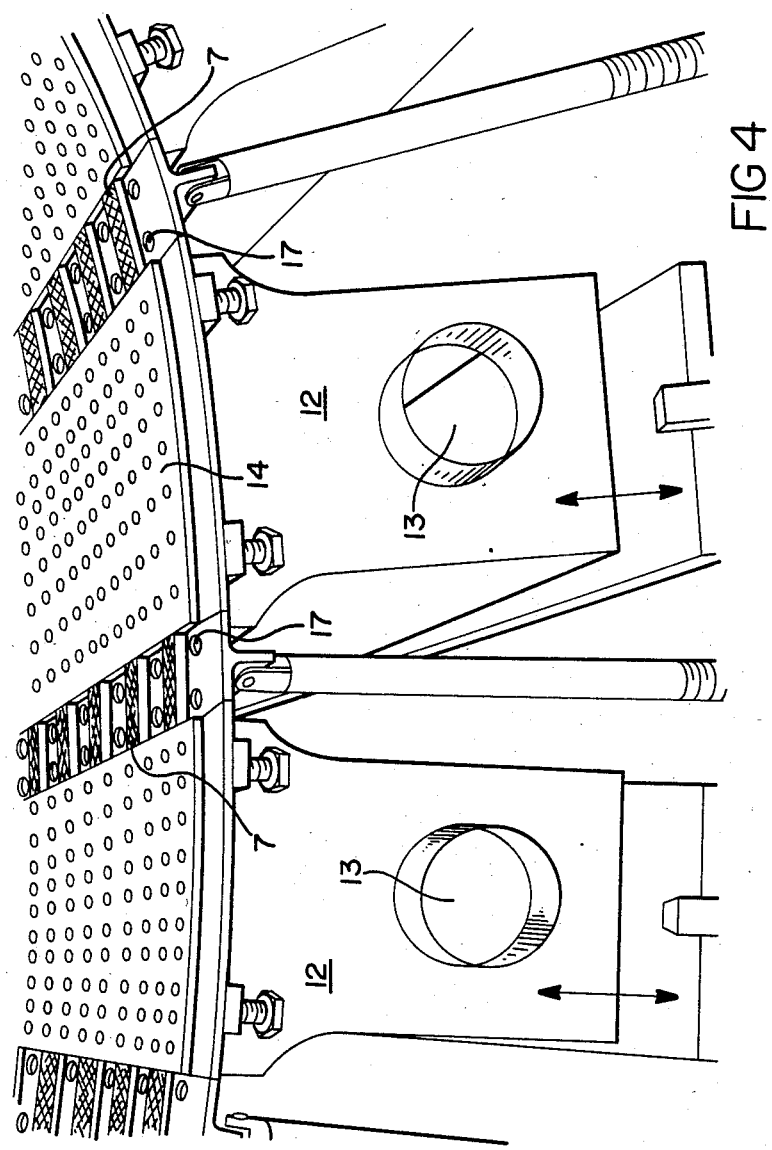

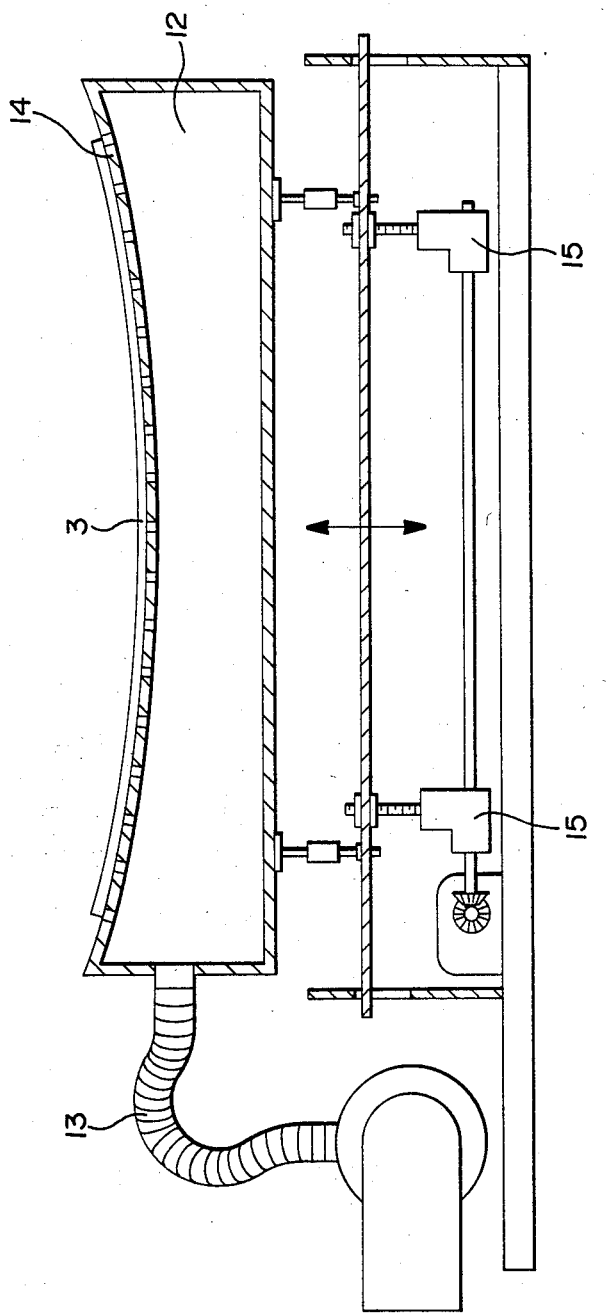

APPARATUS FOR MANUFACTURING OF TEMPERED, BENT GLASS SHEETS

The present invention relates to an apparatus for manufacturing of tempered, bent glass sheets, in particular automobile glass sheets.

For manufacturing bent glass sheets essentially two methods are customary, one method making use of gravitation and the other method using a bending press for forming the glass sheet.

In the first process, the bending is performed by the sagging of the glass lying on the bending frame after softening. This process, however, only allows a limited bending and therefore is only appropriate for particular applications.

In order to achieve stronger curvatures, bending presses were used in order to press the glass, softened in a heating apparatus, to the desired form. A well-known apparatus consists of a transportation device for flat glass sheets which, suspended in a vertical position, are introduced into the electrically heated furnace by means of holding tongs. There the glass sheets are softened in a suspended position and subsequently transported into the bending press by means of the same transportation device. After the bending process, the glass sheets are further transported to a cooling device where they are tempered by means of cooling air. For the known apparatus there exists the problem that an exact bending within tolerances is only given if the flat glass sheet is suspended in a highly accurate position in the transportation device. It is furthermore disadvantageous that on the finished glass sheet the points are distinguishable where the glass sheet was held by the tongs in the transportation device.

The problem underlying the present invention is to achieve a highly efficient apparatus for manufacturing bent glass sheets which avoids the above mentioned disadvantages and is appropriate for manufacturing strongly bent glass sheets.

In order to solve this problem an apparatus is proposed. By means of the invention, a universally applicable apparatus is achieved. An inventive point lies in the combination of an adjustable bending press incorporating a cooling device, thus avoiding the transportation of the bent glass sheet into the cooling device. The positioning of the glass sheet with respect to the bending device is performed in a simple way within the heating device by means of the lifting device; in this way the points of the tongs in the finished glass which turn out to be a disadvantage of the prior art are avoided and the positioning of the glass sheet towards the bending device is obtained in a very simple way.

The bending device is, according to a particular inventive feature, characterized by a pallet-like mount base on which adjustable bending supports determining the form of the bent glass sheet as well as cooling segments with nozzles, directed against the surface of the supported glass sheet, are mounted and adjustable, said cooling segments being movable into the space between two adjacent bending supports, and on which furthermore means for distributing the cooling air to the nozzles of the cooling segments as well as drive means for the movable cooling segments are provided. The adjustable bending supports are coated with a heat resistant tissue. By means of the pallet-like mount base, the bending device together with the cooling devices can be moved into the heating device where the glass sheet, meanwhile lifted by means of the lifting device, is taken over in the desired position. Subsequently the bending device with the pallet-like mount base is transferred out of the heating device to a position directly beneath the bending die. The short stay in the heating device does not damage the adjusting drives and cooling devices mounted and adjusted on the mount base so that the cooling process can be started immediately after the bending process which is started by the lowering of the vertical bending die. To this end, the cooling segments are always connected to an air supply pipe which introduces cooling air into the cooling segments.

According to a further feature of the invention, the cooling segments are movable in lateral guide ways transversely to the plane of the supported glass sheet by means of adjusting spindle drives from a first end position beneath the bending supports to a second end position in which the upper side of the cooling segments, provided with the nozzles, and the upper sides of the bending supports essentially form a bending plane. Immediately before starting the cooling process the cooling segments are driven back from the glass sheet and both sides of the glass sheet are exposed to cooling air until the glass sheet is sufficiently cooled. Then the sheet is removed from the bending device. Hence the bending device is prepared for receiving the next glass sheet within the heating device.

An embodiment of the invention is represented on the drawings and is described in detail hereinunder.

Figure 2:
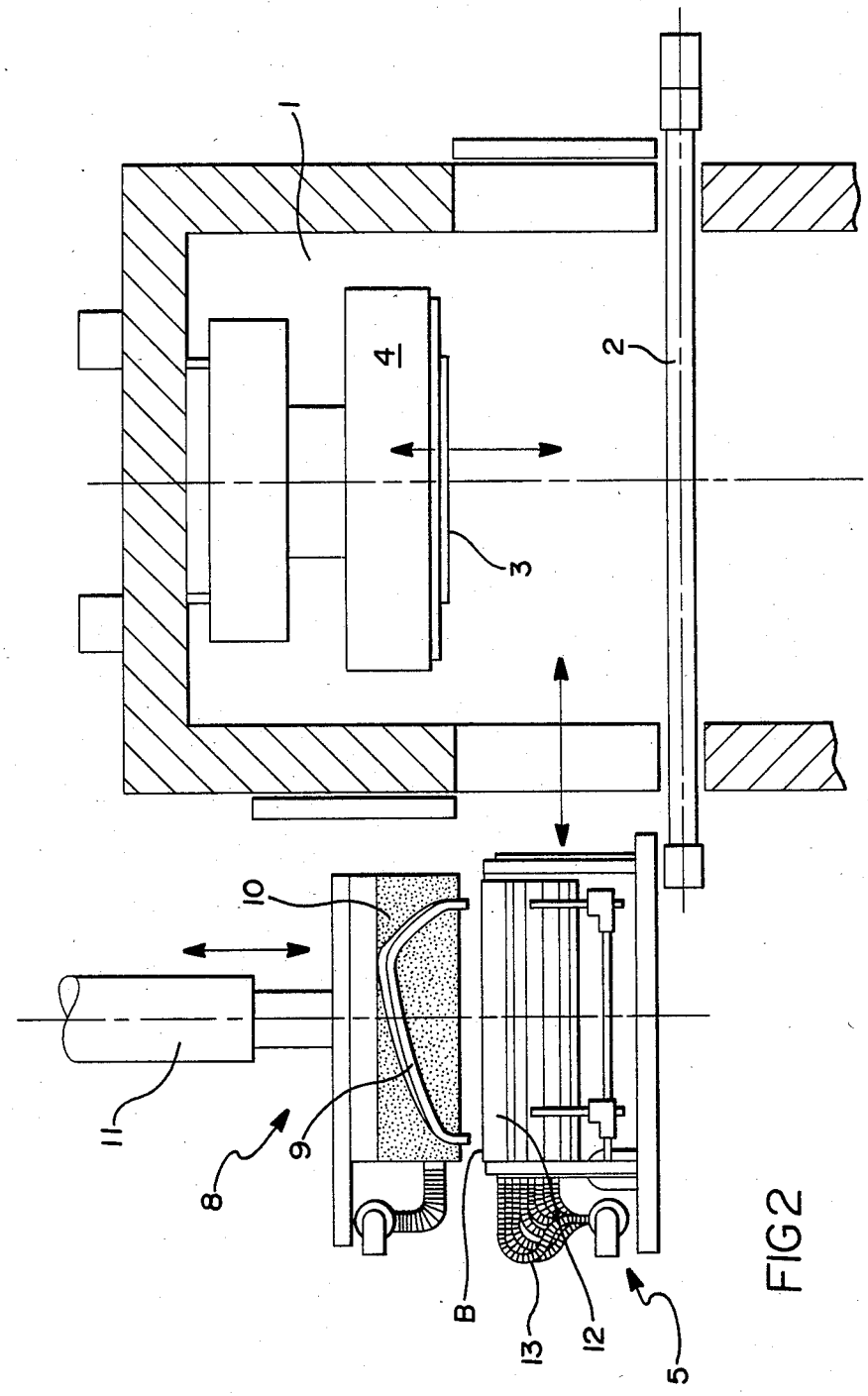

FIG. 1 shows a longitudinal section of the heating device in the area of the vacuum lifting device, FIG. 2 shows a cross section of the heating device as well as of the bending die and of the bending device, FIG. 3 shows a perspective view of the bending device, FIG. 4 shows an enlarged view of the bending supports and cooling segments, and FIG. 5 shows a cross section of the bending device and of the adjusting drives.

In FIG. 1 reference No. 1 designates the heating device which is developed as a furnace in the usual way. The roller-conveyor 2 on which the glass sheet 3 can be transported by means of the driven conveyor rollers beneath the vacuum lifting device, schematically indicated by 4, passes through the heating device 1. The vacuum lifting device 4 can lift the glass sheet from a position on the roller-conveyor 2, the position being indicated by dash-dot lines, to the position being indicated by continuous lines in the drawing.

FIG. 2 represents a cross section of the heating device as well as of the lateral bending device. The specific bending device consists of the mount base 6 on which the adjustable bending supports 7 and cooling segments 12 (FIG. 3), defining the bending plane B, are mounted and adjusted. The bending device is described in detail hereinunder.

Above the bending device 5 the bending die 8 is shown which includes a frame form 9, mounted on a nozzle plate 10. The nozzle plate 10 and the frame form 9 can be lifted and lowered by means of a displacing device 11.

The bending device 5 can be moved in the direction of the arrows into, and out of the heating device 1 through the opened furnace door above the roller-conveyor 2 where it is brought into a position beneath the glass sheet 3 suspended by the vacuum lifting device 4. The exact position of the bending device is determined by stops, not shown in the Figures.

After the bending device 5 has reached its position in the heating device 1 the glass sheet 3 is lowered by means of the vacuum lifting device 4 and deposited on the bending support 7. Subsequently the bending device 5, together with the glass sheet 3, deposited on the bending device, is moved out of the heating device 1 beneath the lifted bending die 8.

By lowering the bending die 8 the glass sheet 3 is formed between the frame form 9 and the bending plane B, defined by the bending supports 7 and the nozzle plates 14, into its desired shape.

In order to start the tempering process, the bending die 8 is lifted by a small distance, and simultaneously the cooling segments, to be described in detail hereinunder, are removed from the surface of the glass sheet. Immediately afterwards the surface of the glass sheet is exposed to cooling air emerging through the nozzle plates 10 and 14.

As it is shown in FIGS. 3 and 4, the bending plane B of the bending device 5 is formed by the bending supports 7 and the cooling segments 12, alternatively placed side by side. The bending plane B is adjustable. The cooling segments 12 are exposable to cooling air which, via the connections 13, emerges through the nozzle plate 14. The bending supports are provided with openings through which at least a part of the cooling air is exhaustable.

FIG. 5 shows a section of a cooling segment 12 before the tempering process has started. In this state the glass sheet lies on the bending supports 7, not shown in this Figure, and on the nozzle plates 14 of the cooling segments 12. By the lowering of the cooling segments 12 by means of spindle drives 15 a distance between the nozzle plates 14 and the surface of the glass sheet is obtained which is necessary for tempering the glass sheet. At the same time cooling air is also blown through the nozzle plates 10 of the bending die 8 on the surface of the glass.

After completion of the tempering process, the glass sheet 3 can be removed from the bending device 5. Then the bending device 5 is prepared for receiving a new glass sheet 3 and, to this end, can be moved again into the heating device 1.

In order to increase the efficiency of the device upon demand, a second identical bending device may be arranged on the other side of the heating device 1 which, to this end, is provided with furnace doors on both sides. By using the two bending devices alternately the operating time may be halfed.

I claim:
1. Apparatus for manufacturing tempered, bent glass sheets, comprising:
   (a) a horizontal continuous conveyor for transporting a planar glass sheet into a heating device for softening the glass sheet;
   (b) a vacuum lifting device for lifting the softened glass sheet from the conveyor within the heating device;
   (c) a bending device, having adjustable bending supports, said bending device being movable in a horizontal direction into the heating device beneath the lifted glass sheet,
   (d) a bending die located outside the heating device and movable vertically for positioning above the bending device after the bending device carries the softened glass sheet out of the heating device; and
   (e) coolant segments in the bending device as well as in the bending die for cooling the bent glass sheet, said coolant segments being connectable to a fluid supply pipe to introduce cooling fluid into the cooling segments.

2. Apparatus for manufacturing tempered, bent glass sheets as in claim 1, further comprising a pallet-like mount base on which the adjustable bending supports are mounted and adjustable to determine the form of the bent glass sheet, and the cooling segments having air nozzles directed toward the surface of the supported glass sheet, each of said cooling segments being movable into the space between two adjacent bending supports, and distributing means for supplying cooling air to the nozzles of the cooling segments.

3. Apparatus for manufacturing tempered, bent glass sheets as in claim 2, further including adjusting spindle drives for moving the cooling segments, each adjusting spindle drive having an associated drive means, guide ways that guide the cooling segments for movement transversely to the bending plane of the supported glass sheet from a first end position beneath the bending supports to a second end position in which the cooling segments and the bending supports essentially form the bending plane.

4. Apparatus for manufacturing of tempered glass sheet as in claim 2, wherein the adjustable bending supports include a heat resistant tissue coating.

5. Apparatus for manufacturing of tempered, glass sheets as in any one of claims 1 through 4, wherein the bending supports are provided with openings through which at least a part of the cooling fluid is exhaustable.

* * * * *